No. 699,005. Patented Apr. 29, 1902.
S. E. OVIATT.
VEHICLE WHEEL.
(Application filed Oct. 3, 1901.)
(No Model.)
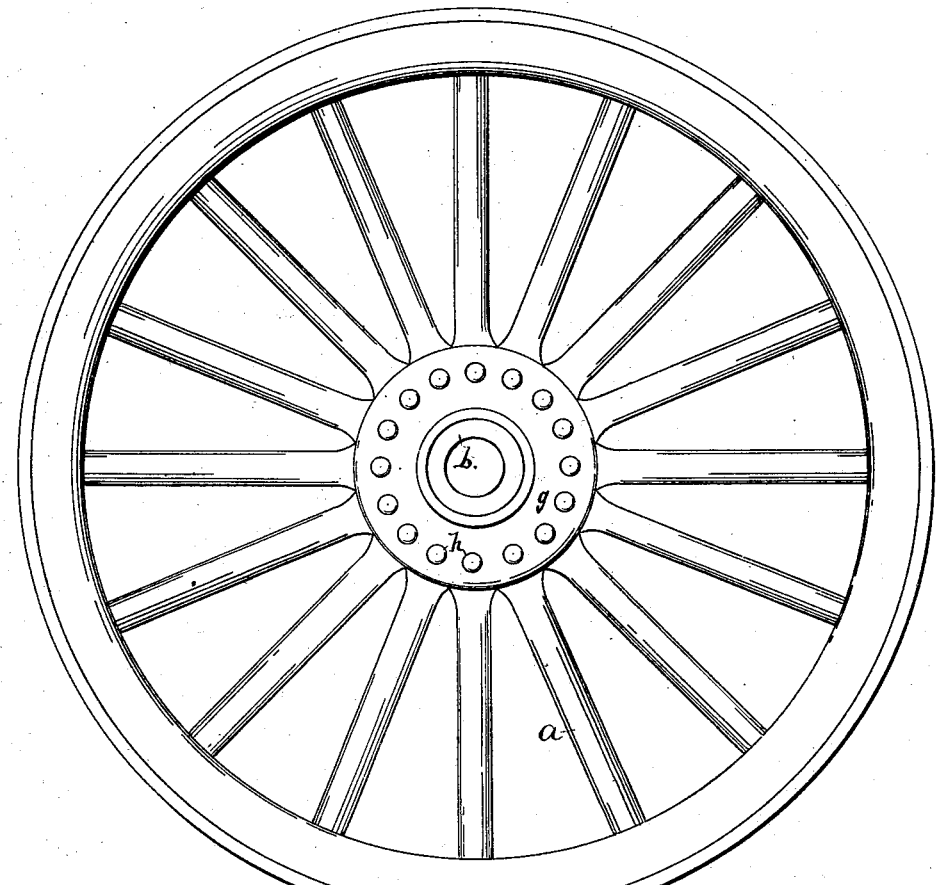
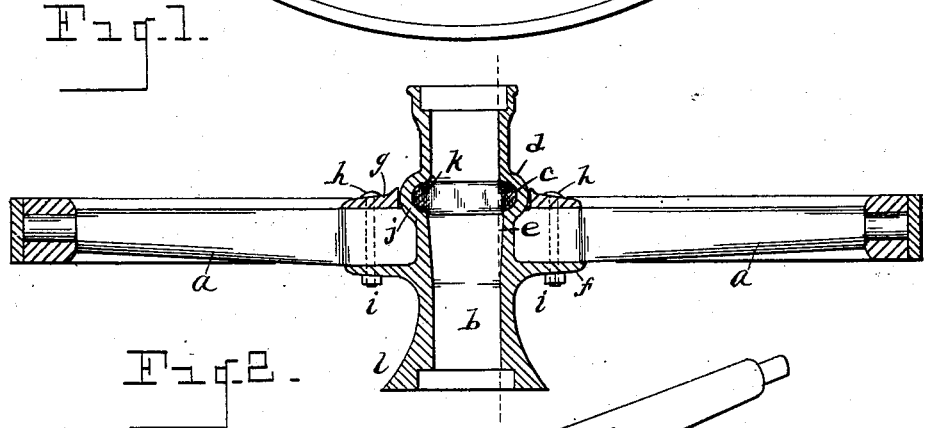
WITNESSES.  INVENTOR.

UNITED STATES PATENT OFFICE.

SOLOMON E. OVIATT, OF LANSING, MICHIGAN.

VEHICLE-WHEEL.

SPECIFICATION forming part of Letters Patent No. 699,005, dated April 29, 1902.

Application filed October 3, 1901. Serial No. 77,361. (No model.)

*To all whom it may concern:*

Be it known that I, SOLOMON E. OVIATT, a citizen of the United States, residing at Lansing, county of Ingham, State of Michigan, have invented a certain new and useful Improvement in Vehicle-Wheels; and I declare the following to be a full, clear, and exact description of the invention, such as will enable others skilled in the art to which it appertains to make and use the same, reference being had to the accompanying drawings, which form a part of this specification.

My invention has for its object certain new and useful improvements in vehicle-wheels; and it consists in the constructions hereinafter described and claimed, and illustrated in the accompanying drawings, in which—

Figure 1 is a view in side elevation. Fig. 2 is a view in section longitudinally of the hub. Fig. 3 is a detail view of the inner end of one of the spokes.

My invention more specifically pertains to the construction of the hub and the manner of engaging the inner ends of the spokes therewith.

Accordingly, as shown in the drawings, $a$ denotes the spokes of the wheel, and $b$ the hub. The hub is constructed of metal and is provided with a lubricating-chamber (indicated at $c$) within the bore of the hub. This chamber may be formed by constructing the hub with an outwardly-projecting bead or flange $d$. Adjacent to the chamber so formed the inner wall of the hub is also preferably beveled outward or flared outward, as indicated at $e$, thereby increasing the capacity of said chamber. This chamber, it will be seen, is formed between the ends of the hub and provides for a greater quantity of lubricating material to be contained therein than in hubs as ordinarily constructed—a matter of very much importance. The hub is also constructed with an integral flange $f$, projecting outward from the body of the hub intermediate of its ends. A movable band or ring $g$ is also engaged upon the hub, preferably over the bead $d$, and spaced from the flange $f$ to allow the inner ends of the spokes to fit in therebetween. The inner ends of the spokes are preferably beveled on opposite sides, as shown at the numerals 1 and 2, the beveled faces of the different spokes fitting snugly one against another. This construction makes the inner ends of the spokes wedge-shaped. Bolts $h$ are preferably employed to unite the individual spokes to the flange $f$ and band $g$, the bolts being provided with nuts $i$.

It is well known that in various parts of the country great damage is done to vehicle-wheels by drought and heat, causing the wooden spokes to contract, and thus work loose; but it will be clear that by my construction the bolts may be readily tightened up, thereby tightening the movable band $g$ up against the inner ends of the spokes and taking up all lost motion or looseness. This also I deem a matter of superior importance as a feature of my invention.

In first entering the spokes between the flange $f$ and band $g$ I prefer that they should not quite seat upon the periphery of the hub. Then when the felly and tire are put on the wedge shape of the inner ends of the spokes permits of their being forced inward, so as to seat at their inner ends directly upon the hub, thereby increasing the firmness of the construction. It will be seen that one corner of the inner ends of the spokes, as at $j$, comes into contact with the adjacent portion of the bead $d$, the corner of the spoke wedging thus against the said portion of the bead, whereby the spokes are forced more firmly against the integral flange $f$, thereby adding to the strength of the wheel and enabling it better to withstand the strain in the sluing of the wheel.

The chamber $c$, formed by the annular bead $d$, it will be observed, extends annularly about the inner periphery of the hub. Where it is desired to use fluid lubricating material, a wicking $k$ or other fibrous or analogous material may be located in said chamber to aid in holding and in distributing the lubricating material. The provision of this lubricating-chamber about the axle of the vehicle enables the vehicle to be used for a much longer period without renewed greasing or oiling than on other wheels of ordinary construction. The inner end of the hub is also constructed to form a mud deflector or guard. For this purpose the said end of the hub is constructed with an outwardly-projecting flange $l$, the hub adjacent thereto being preferably flared or curved outwardly, said flange tending in the revolution of the wheel to throw the mud and dirt away from the end of the hub, and thereby to prevent its working over the end of the hub and into the axle or into the interior of the hub.

My invention thus has among its special objects, together with the general construction and arrangement of devices, first, to provide for better lubrication of the hub; second, for taking up any looseness in the engagement of the spokes with the hub, and, third, to provide the hub with a mud or dirt deflector.

The inner lubricating-chamber $c$, it will be seen, is in the nature of an annular groove or recess in the inner wall of the hub.

By constructing the hub with the deflector the mud or dirt is thrown inward toward the center of the hub and prevented thereby from having any access into the interior of the hub.

What I claim as my invention is—

1. A vehicle-hub, constructed with an outwardly-projecting annular bead forming an interior annular lubricating-chamber in the inner wall of the hub, said wall flared outwardly adjacent to said chamber to increase the capacity of the chamber.

2. A vehicle-hub constructed with an outwardly-projecting flange intermediate of the ends thereof and with an outwardly-projecting bead, said hub having in combination therewith a laterally-movable outwardly-projecting band intermediate of the ends thereof seating on said bead and spokes having their inner ends engaged between said flange and said hub.

3. A vehicle-hub constructed with a stationary outwardly-projecting flange intermediate of the ends thereof and with an outwardly-projecting bead said hub having in combination therewith a laterally-movable outwardly-projecting band intermediate of the ends thereof seating upon said bead, and spokes having their inner ends engaged between said flange and said band, and bolts uniting said flange and band whereby the movable band may be tightened against the inner ends of the spokes to take up any looseness in the engagement of the spokes with the hub.

4. A vehicle-hub constructed with a stationary outwardly-projecting flange intermediate of the ends thereof, and with an outwardly-projecting bead intermediate of the ends of the hub, a movable outwardly-projecting band seating upon said bead, spokes having their inner ends engaged between said band and flange, and bolts passed through said flange and band, whereby the movable band may be tightened against the adjacent ends of the spokes.

5. A vehicle-hub constructed with a stationary flange intermediate of the ends thereof, and with an outwardly-projecting bead, said hub having in combination therewith a movable band intermediate of the ends thereof seating upon said bead, spokes, wedge-shaped at their inner ends, engaged between said flange and band, bolts passed through each of said spokes and through said flange and band, and nuts upon said bolts whereby the movable band may be tightened against said spokes, said bead forming an interior lubricating-chamber.

In testimony whereof I sign this specification in the presence of two witnesses.

SOLOMON E. OVIATT.

Witnesses:
N. S. WRIGHT,
J. M. POLAND.